(12) United States Patent
Cheng et al.

(10) Patent No.: US 7,703,928 B2
(45) Date of Patent: Apr. 27, 2010

(54) OPTICAL PROJECTION APPARATUS

(75) Inventors: Chu-Ming Cheng, Hsinchu (TW); Kuan-Hung Chen, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 902 days.

(21) Appl. No.: 11/470,630

(22) Filed: Sep. 7, 2006

(65) Prior Publication Data

US 2007/0070307 A1 Mar. 29, 2007

(30) Foreign Application Priority Data

Sep. 29, 2005 (TW) .............................. 94133943 A (51) Int. Cl.
*G03B 21/28* (2006.01)
(52) U.S. Cl. .................... 353/81; 359/638; 359/831; 359/834
(58) Field of Classification Search ............. 353/30–33, 353/97, 81, 102; 349/8, 9; 348/756, 757; 359/831, 834
See application file for complete search history.

(56) References Cited

U.S. PATENT DOCUMENTS

| | | | |
|---|---|---|---|
| 6,439,726 B1 | 8/2002 | Piehler | |
| 6,471,356 B1 * | 10/2002 | Gohman et al. | 353/33 |
| 6,784,946 B1 | 8/2004 | Schroter et al. | |
| 6,961,194 B2 * | 11/2005 | Penn | 359/833 |
| 7,315,418 B2 * | 1/2008 | DiZio et al. | 359/500 |
| 7,377,655 B2 * | 5/2008 | Manabe et al. | 353/33 |
| 2004/0233409 A1 | 11/2004 | Schuster et al. | |
| 2007/0024981 A1 * | 2/2007 | Duncan et al. | 359/637 |

FOREIGN PATENT DOCUMENTS

| | | |
|---|---|---|
| FR | 2866439 | 8/2005 |
| TW | 528880 | 4/2003 |
| TW | 200508810 | 3/2005 |
| TW | 200528757 | 9/2005 |

* cited by examiner

*Primary Examiner*—Que T Le
*Assistant Examiner*—Jerry Brooks
(74) *Attorney, Agent, or Firm*—Jianq Chyun IP Office (57) ABSTRACT

An optical projection apparatus is provided, where a reflective light valve, a light deflecting device and a lens set are arranged on an optical path of the light beam providing by an illuminating system. The light deflecting device is located between the illuminating system and the reflective light valve, and the lens set is located between the reflective light valve and the light deflecting device. When the light beam is incident to the reflective light valve through the light deflecting device and the lens set, the light beam is converted into sub-image beams, and then the sub-image beams are reflected to the lens set. The projection lens set arranged on an optical path of the sub-image beams has a pupil located on the light deflecting device. The lens set converges the sub-image beams on the pupil and then the sub-image beams are incident to the projection lens set for imaging.

17 Claims, 6 Drawing Sheets

OPTICAL PROJECTION APPARATUS

CROSS-REFERENCE TO RELATED APPLICATION

This application claims the priority benefit of Taiwan application serial no. 94133943, filed on Sep. 29, 2005. All disclosure of the Taiwan application is incorporated herein by reference.

BACKGROUND OF THE INVENTION

1. Field of the Invention

The present invention relates to a display apparatus. In particularly, the present invention relates to an optical projection display apparatus.

2. Description of Related Art

Figure 1:
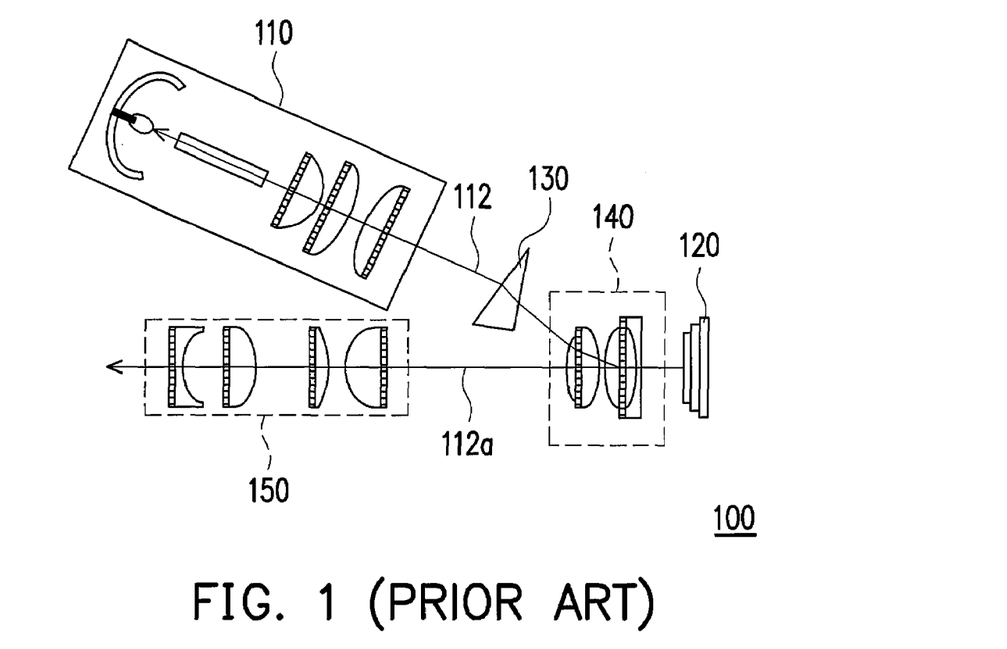
FIG. 1 is a schematic structure diagram of a conventional optical projection apparatus.

FIG. 1 shows an optical projection apparatus 100 disclosed by U.S. Pat. No. 6,784,946. The optical projection apparatus 100 comprises an illuminating system 110, a reflective light valve 120, a prism 130, a lens set 140 and a projection lens set 150. The illuminating system 110 is used for providing a light beam that sequentially passes through the prism 130, the lens set 140, and then is incident to the reflective light valve 120. The reflective light valve 120 is a digital micro-mirror device (DMD). The reflective light valve 120 is used for converting the light beam 112 into a plurality of sub-image beams 112a, and then reflecting the sub-image beams 112a to the lens set 140. Then, the sub-image beams 112a are incident to the projection lens set 150 for imaging.

One key point for determining whether the imaging of the optical projection apparatus is clear is that whether or not the sub-image beams 112a is precisely projected to the projection lens set 150. This factor is determined by an arrangement of a relative position between the prism 130 and the lens set 140. If the relative position between the prism 130 and the lens set 140 has an error, the incident angle of the light beam 112 is changed. Thereby, the sub-image beams 112a deviates and is not correctly projected into the projection lens set 150. Although the elements of the optical projection apparatus 100 become miniaturized, the accuracy for assembling the optical projection apparatus 100 is not as good as expected. Therefore, the image quality is degraded.

Figure 2:
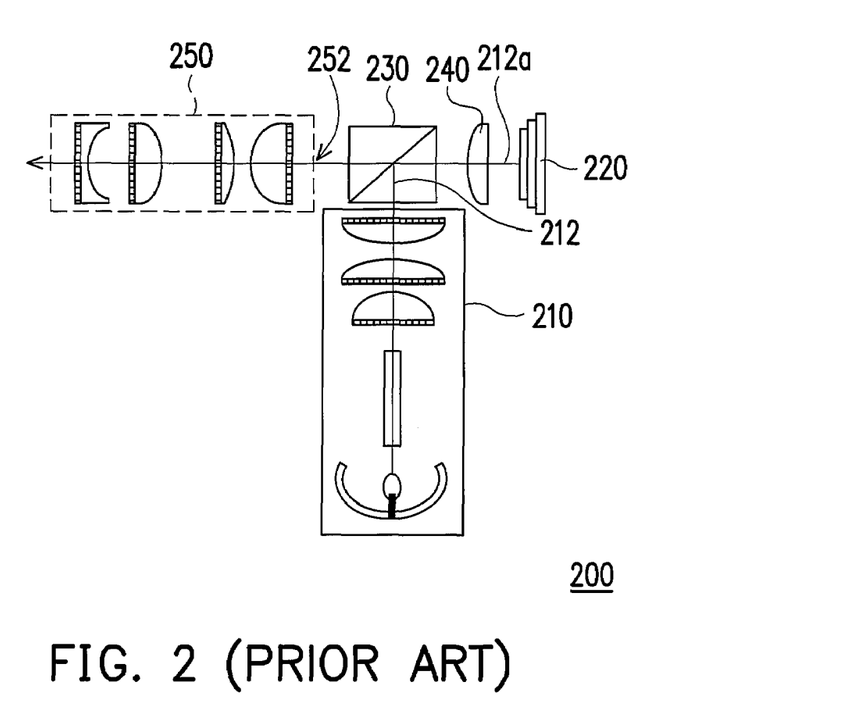
FIG. 2 is a schematic structure diagram of another conventional optical projection apparatus.

FIG. 2 shows an optical projection apparatus 200 disclosed by U.S. Pat. No. 6,471,356. The optical projection apparatus 200 comprises an illuminating system 210, a reflective light valve 220, a total internal reflection (TIR) prism 230, a lens 240 and a projection lens set 250. The illuminating system 210 is used for providing a light beam 212, sequentially passing through the TIR prism 230, the lens 240 and the reflective light valve 220. The reflective light valve 220 is a DMD. The reflective light valve is used for converting the light beam 212 into a plurality of sub-image beams 212a, and then reflecting the sub-image beams 212a back to the lens 240. The projection lens 250 has a pupil 252 located within or at a side surface of the projection lens set 250. The sub-image beams 212a are converged at the pupil 252 and incident to the projection lens set 250 for imaging.

Figure 3:
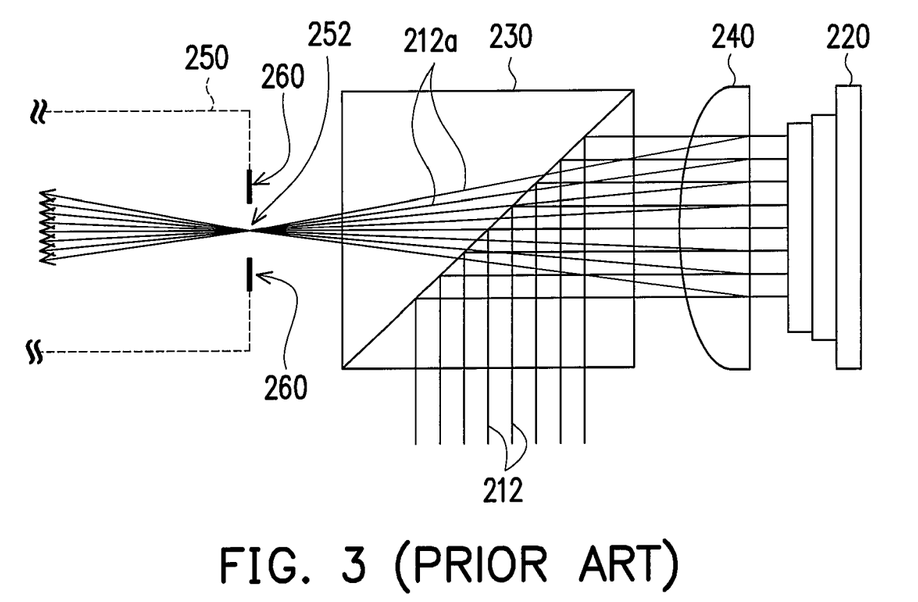
FIG. 3 is an enlarged diagram showing a reflective light valve, a total internal reflection prism and a lens in FIG. 2.

FIG. 3 is a schematically enlarged diagram of the reflective light valve, the total internal reflection prism and the lens shown in FIG. 2. Referring to FIGS. 2 and 3, when the light beam 212 is incident to the reflective light valve 220, such as a DMD (not shown), the reflective light valve 220 has a plurality of micro-mirrors (not shown) to convert the light beam 212 into a plurality of sub-image beams 212a. The ON-state micro-mirrors reflect the light beam 212 back to the lens 240, and the OFF-state micro-mirrors deviate the light beam 212 away from the lens 240. The lens 240 converges the sub-image beams 212 on the pupil 252, and then the sub-image beams 212a are incident to the projection lens set 250 for imaging. In addition, the optical projection apparatus 200 further comprises an aperture stop 260, which corresponds to the pupil 252 and is located within or at the side surface of the projection lens set 250. The function of the aperture stop 260 is used for determining a diameter of a light cone that light emitted from the optical projection apparatus 400 passes through, and an illuminance of the passed light. Further, the aperture stop 260 is further used for blocking environmental stray light from entering the projection lens set 250 to form images, so as to prevent blurred images. Since the TIR prism 230 is set within the optical projection apparatus 200, the design of an optical path is simplified and error in angle deviation for the optical path becomes smaller.

However, it is unavoidable that stray light is likely to occur in the optical projection apparatus 200. In the aforementioned apparatus, the pupil 252 and the aperture stop 260 are set at the rear end of the entire optical path to block and filter the stray light. However, such arrangement decreases the function of the aperture stop 260, and consequently, a large portion of the stray light is not efficiently blocked and the image quality is degraded.

SUMMARY OF THE INVENTION

According to the foregoing description, the invention is to provide an optical projection apparatus, in which the position of the pupil is adjusted to efficiently work with the aperture stop, so that the stray light is blocked and the image quality is increased.

Furthermore, the present invention is also to provide an optical projection apparatus, in which by setting an aspheric prism therein, the assembling accuracy of the optical projection apparatus is increased and the image quality is improved.

According to the above and other objects, the present invention provides an optical projection apparatus which comprises an illuminating system, a reflective light valve, a light deflecting device, a lens set and a projection lens set. The illuminating system is used for providing a light beam. The reflective light valve is arranged on an optical path of the light beam. The light deflecting device is arranged on the optical path of the light beam between the illuminating system and the reflective light valve. The lens set is arranged on an optical path of the light beam and located between the reflective light valve and the light deflecting device. The light deflecting device is used for receiving and transmitting the light beam to the lens set, so that the light beam is incident to the reflective light valve through the lens set. The reflective light valve is used for converting the light beam into a plurality of sub-image beams and then reflecting the sub-image beams to the lens set. In addition, the projection lens set is arranged on an optical path of the sub-image beams. The projection lens set has a pupil at a position corresponding to the light deflecting device, and the lens set is used for converging the sub-image beams to the pupil and the sub-image beams are then incident to the projection lens set for imaging.

According to another embodiment, the present invention provides an optical projection apparatus which comprises an illuminating system, a reflective light valve, an aspheric prism and a projection lens set. The illuminating system is used for providing a light beam. The reflective light valve is arranged on an optical path of the light beam. The aspheric prism is arranged on the optical path of the light beam and located between the illuminating system and the reflective light valve. The aspheric prism at least comprises a first curved surface, a second curved surface, a total reflection surface and an incident surface. The first curved surface is opposite to the second curved surface. The total-reflection surface is connected to one rim of the second curved surface, and the incident surface is connected between the first curved surface and the total-reflection surface. The light beam is incident into the aspheric prism through the incident surface and totally reflected by the total-reflection surface, and then incident to the reflective light valve through the first curved surface, so that the light beam is converted into a plurality of sub-image beams by the reflective light valve. In addition, the projection lens set is arranged on an optical path of the sub-image beams. The reflective light valve is used for reflecting the sub-image beams to the aspheric prism, and the sub-image beams sequentially pass through the first and the second curved surfaces of the aspheric prism and then are incident to the projection lens set.

According to the embodiments of the present invention, the pupil is arranged at the position corresponding to the light deflecting device, the stray light is effectively blocked together with the aperture stops, so that the images projected from the optical projection apparatus will have better quality. In addition, the optical projection apparatus of the present invention uses the aspheric prism so that the projection lens set, the aspheric prism and the lens set is integrated to form a projection lens. By only adjusting the relative position of the projection lens and the illuminating system, the accuracy for assembling the optical projection apparatus is increased. Moreover, since the aspheric prism is made by a molding or an injection method, the manufacturing cost is also lowered.

It is to be understood that both the foregoing general description and the following detailed description are exemplary, and are intended to provide further explanation of the invention as claimed.

DESCRIPTION OF THE PREFERRED EMBODIMENT

Figure 4:
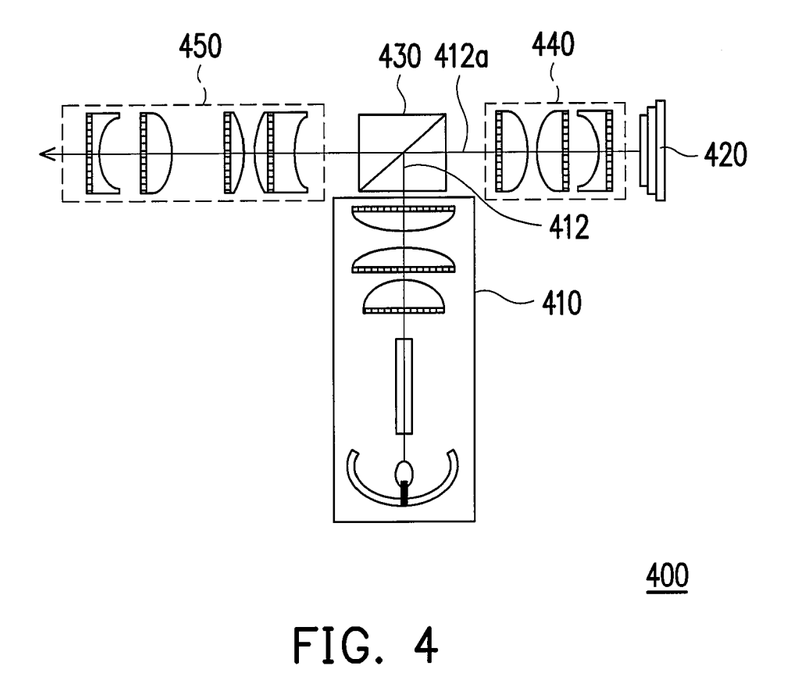
FIG. 4 shows a schematic structure diagram of an optical projection apparatus according to one embodiment of the present invention.

FIG. 4 shows a schematic structure diagram of an optical projection apparatus according to one embodiment of the present invention. Referring to FIG. 4, the optical projection apparatus 400 comprises an illuminating system 410, a reflective light valve 420, a light deflecting device 430, a lens set 440 and a projection lens set 450. The illuminating system 410 is used for providing a light beam 412, and the reflective light valve 420 is arranged on an optical path of the light beam 412. In the embodiment, the reflective light valve 420 is a digital micro-mirror device (DMD) or a liquid crystal on silicon (LCoS). The light deflecting device 430 is arranged on the optical path of the light beam 412, and located between the illuminating system 410 and the reflective light valve 420. In the embodiment, the light deflecting device 430 is a TIR prism, for example. The lens set 440 is arranged on the optical path of the light beam 412, and located between the reflective light valve 420 and the light deflecting device 430. The lens set 440 is arranged on the optical path of the light beam 412, and located between the reflective valve 420 and the light deflecting device 430. The light deflecting device 430 is used for receiving and redirecting the light beam 412 to the lens set 440, so that the light beam 412 is incident to the light valve 420 through the lens set 440. The reflective light valve 420 is used for converting the light beam into a plurality of sub-image beams 412a, and the sub-image beams 412a are reflected to the lens set 440. The projection lens set 450 is arranged on an optical path of the sub-image beams 412a. The projection lens set 450 has a pupil (not shown) located at the position corresponding to the light deflecting device 430. The lens set 440 is used for converging the sub-image beams 412a to the pupil and then the sub-image beams 412a are incident to the lens set 450 for image formation.

Figure 5A:
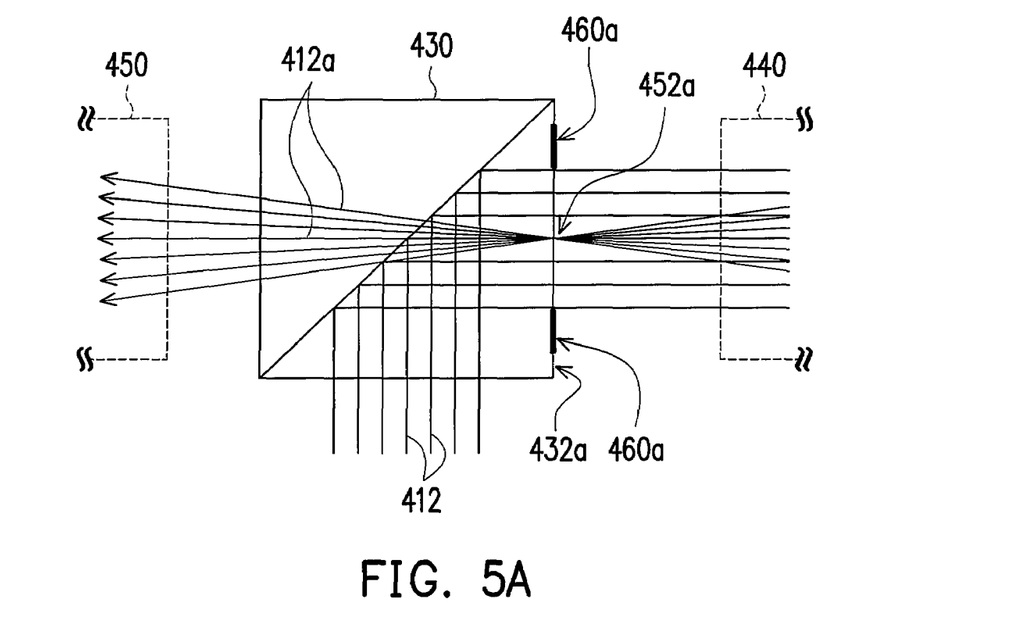
FIGS. 5A to 5C are schematically enlarged diagrams for the light deflecting device shown in FIG. 4.

FIG. 5A schematically shows an enlarged diagram for the light deflecting device shown in FIG. 4. Referring to FIGS. 4 and 5A, the pupil 452a is located on one surface 432a of the light deflecting device 430, and this surface 432a faces to the lens set 440. The reflective light valve 420 has a plurality of micro-mirrors (not shown), and the light beam 412 is converted into a plurality of sub-image beams 412a when the light beam 412 is incident to the reflective light valve 420, such as a DMD. The ON state micro-mirrors reflect the light beam 412 to the lens set 440 and the OFF state micro-mirrors deflects the light beam 412 away from the lens set 440. The lens set converges the sub-image beams 412a to the pupil 452a, and then the sub-image beams 412a are incident to the projection lens set 450 for image formation. In addition, the optical projection apparatus 400 further comprises an aperture stop 460a. The aperture stop 460a corresponds to the pupil 452a and is arranged at a side surface 432a of the light deflecting device 430. The function of the aperture stop 460a is used to determine a diameter of a light cone that light emitted from the optical projection apparatus 400 passes through, and an illuminance of the passed light. Moreover, the aperture stop 460a is further used to block environmental stray light from entering the projection lens set 450 to form images, so as to prevent blurred image.

Figure 5B:
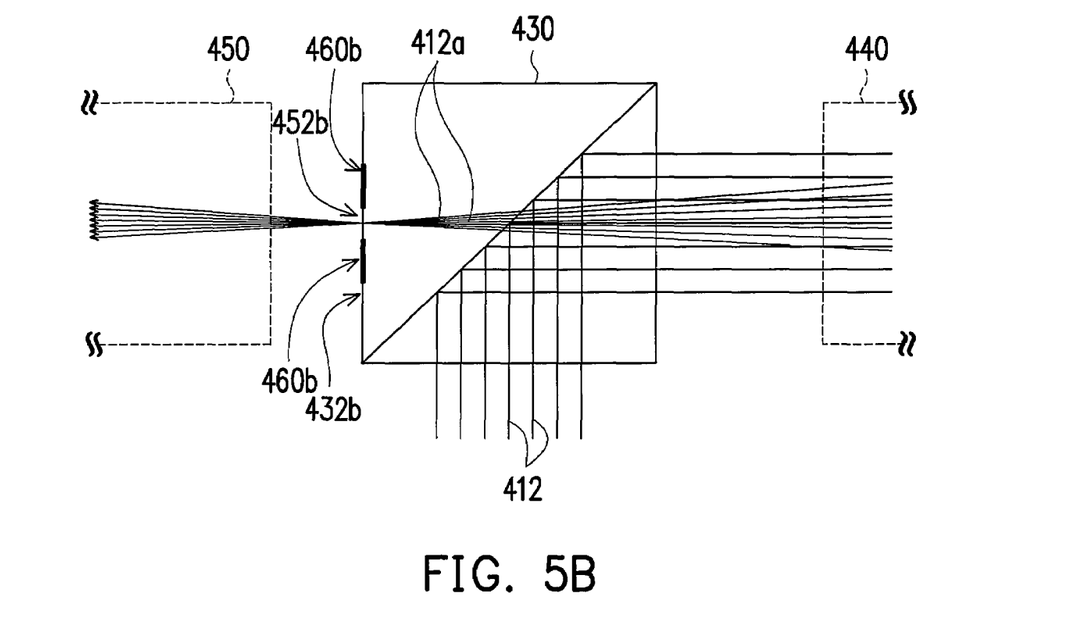
Figure 5C:
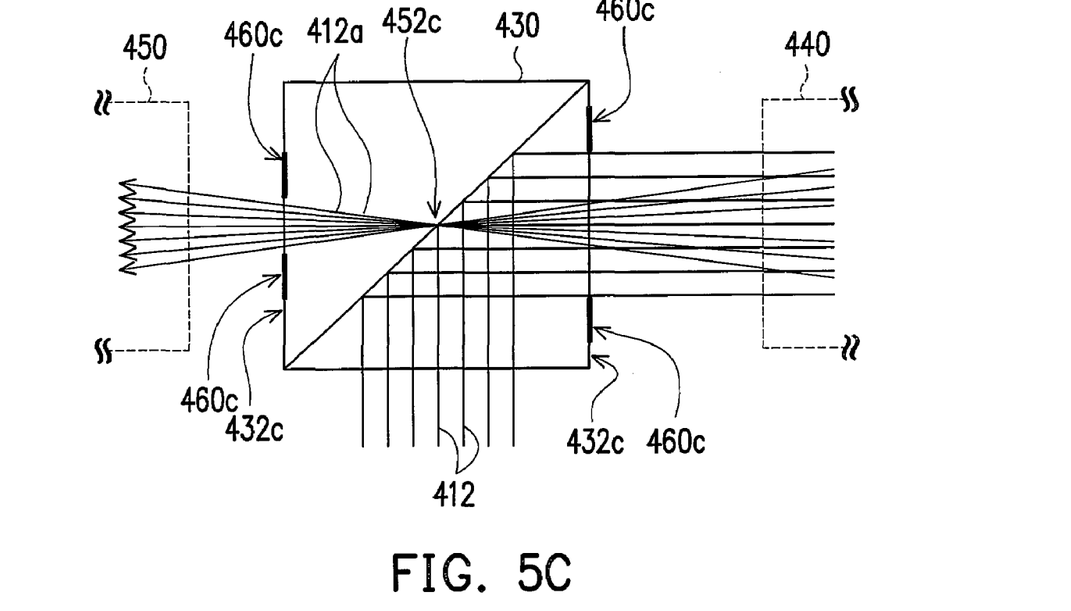

In addition, FIGS. 5B and 5C respectively show enlarged diagrams of the light deflecting device according to other embodiments of the present invention. Referring to FIG. 5B together with FIG. 4, the pupil 452b is located on one surface 432b of the light deflecting device 430, and this surface 432b faces to the projection lens set 450. The optical projection apparatus 400 further comprises an aperture stop 460b. The aperture stop 460b is set corresponding to the pupil 452b, and is arranged at a side surface 452b of the light deflecting device 430. Referring to FIGS. 4 and 5C, the pupil 452c is located at a position inside the light deflecting device 430. The optical projection apparatus 400 further comprises two aperture stops 460c. The aperture stops 460c are set corresponding to the pupil 452c, and are respectively arranged at two side surfaces 452c of the light deflecting device 430. In the aforementioned embodiment, the pupils 452a, 452b and 452c are arranged at the position of the light deflecting device 430; namely, the pupils 452a, 452b and 452c are arranged at the middle of the whole optical path. Therefore, due to the aperture stops 460a, 460b and 460c, a large portion of the environmental stray light is blocked. In this way, images formed from the stray light are reduced, and therefore, the image quality is improved.

Figure 6:
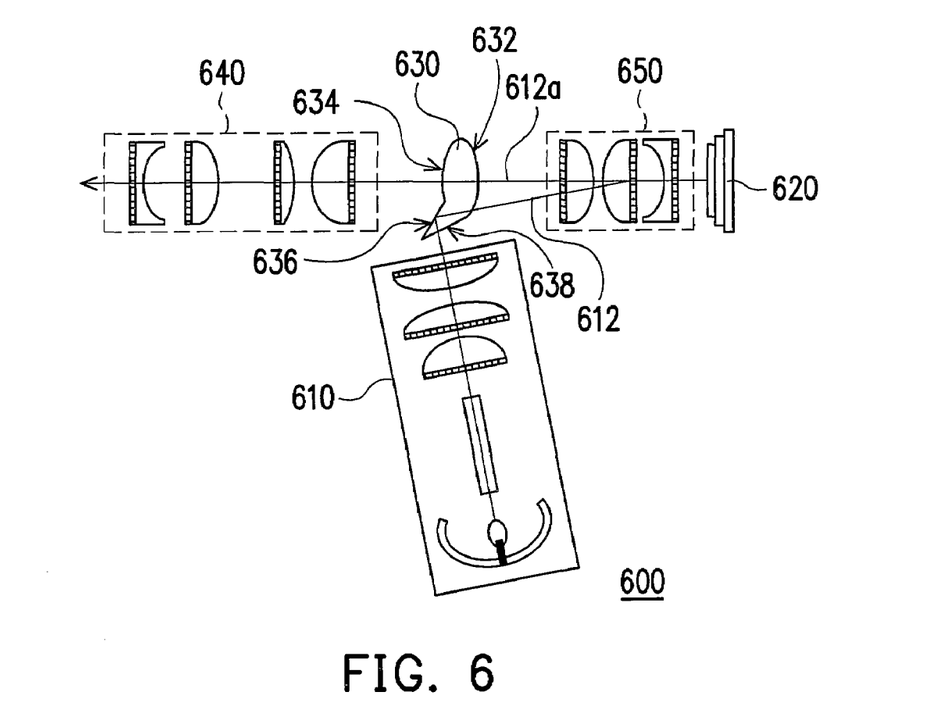
FIG. 6 schematically shows a structure of an optical projection apparatus according to another embodiment of the present invention.

FIG. 6 schematically shows a structure of an optical projection apparatus according to another embodiment of the present invention. Referring to FIG. 6, the optical projection apparatus 600 comprises an illuminating system 610, a reflective light valve 620, an aspheric prism 630 and a projection lens set 640. The illuminating system 610 is used for providing a light beam 612. The reflective light valve 620 is arranged on an optical path of the light beam 612. In this embodiment, the reflective light valve 620 is a DMD or a LCoS. The aspheric prism 630 is arranged on the optical path of the light beam 612 and located between the illuminating system 610 and the reflective light valve 620. The aspheric prism 630 at least comprises a first curved surface 632, a second curved surface 634, a total-reflection surface 636 and an incident surface 638. The first curved surface 632 is arranged to be opposite to the second curved surface 634. The total-reflection surface is connected to one rim of the second curved surface 632, and the incident surface 638 is connected between the first curved surface 632 and the total-reflection surface 636. The light beam 612 is incident into the aspheric prism 630 through the incident surface 638, and then totally reflected by the total-reflection surface 636. Then, the totally reflected light beam is incident into the reflective light valve 620 through the first curved surface 632. The reflective light valve 620 is used for converting the light beam 612 into a plurality of sub-image beams 612a, and then reflecting the sub-image beams 612a to the aspheric prism 630. The projection lens set 640 is arranged on the optical path of the sub-image beams 612a, and the sub-image beams 612a sequentially pass through the first and the second curved surfaces 632, 634 of the aspheric prism 630, and then are incident into the projection lens set 640.

As described above, the optical projection apparatus 600 further comprises a lens set 650, arranged on the optical path of the light beam 612 and the sub-image beams 612a and located between the reflective light valve 620 and the aspheric prism 630.

Figure 7A:
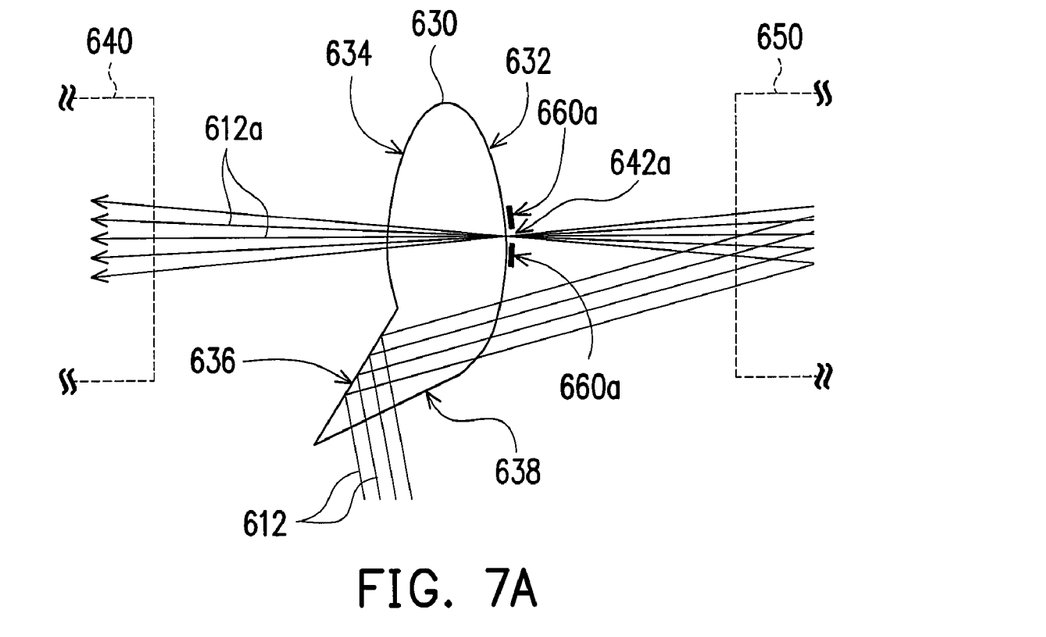
FIGS. 7A to 7C are schematically enlarged diagrams of the aspheric prism shown in FIG. 6.

The projection lens set 640 has a pupil (not shown) at the position of the aspheric prism 630, and the lens set 650 is used for converging the sub-image beams 612a to the pupil, so that the sub-image beams 612a is incident to the projection lens set 640 for image formation. FIG. 7A is a schematically enlarged diagram of the aspheric prism 630 shown in FIG. 6. Referring to FIGS. 6 and 7A, the pupil 660a is located on the first curved surface 632 of the aspheric prism 630. When the light beam 612 is incident to the reflective light valve 620, such as a DMD, the light beam 612 is converted into the sub-image beams 612a because the reflective light valve 620 comprises a plurality of micro-mirrors (not shown). The ON-state micro-mirrors will reflect the light beam 612 back to the lens set 640, and the OFF-state micro-mirrors will deflect the light beam 612 away from the lens set 640. The lens set 650 converges the sub-image beams 612 at the pupil 642a, and then the sub-image beams 612a are incident to the projection lens 640 for image formation. In addition, the optical projection apparatus 600 further comprises an aperture stop 660a corresponding to the pupil 642a and the aperture stop 660a is arranged on the first curved surface 632. The function of the aperture stop 660a is used to block environmental stray light from entering the projection lens set 640 and forming images therein. In this way, formation of blurred images is avoided.

Figure 7B:
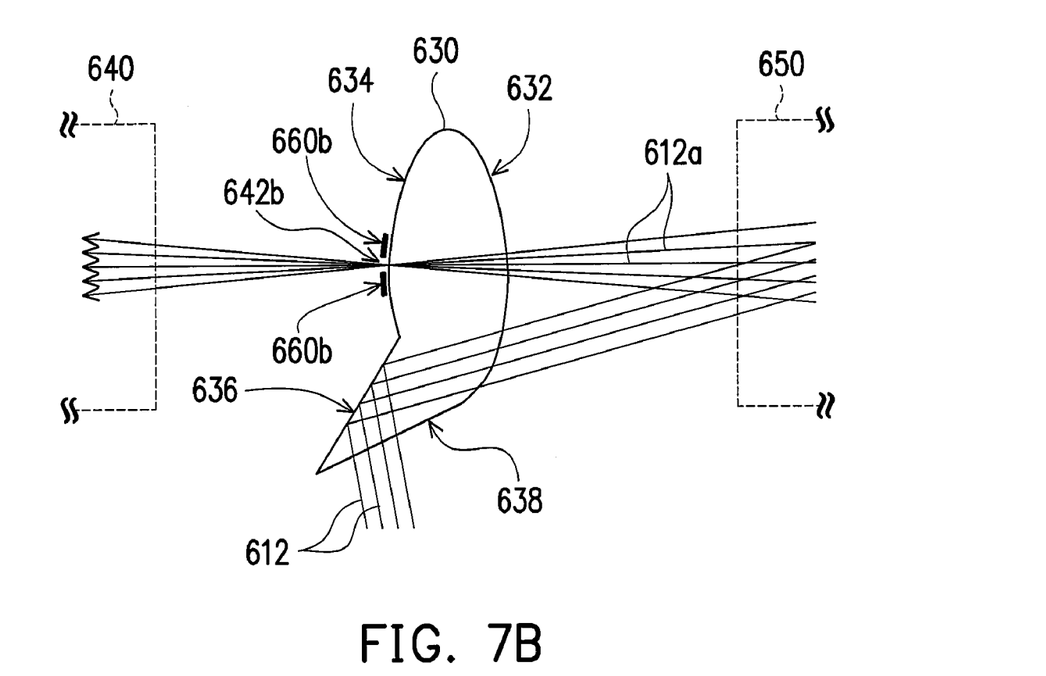
Figure 7C:
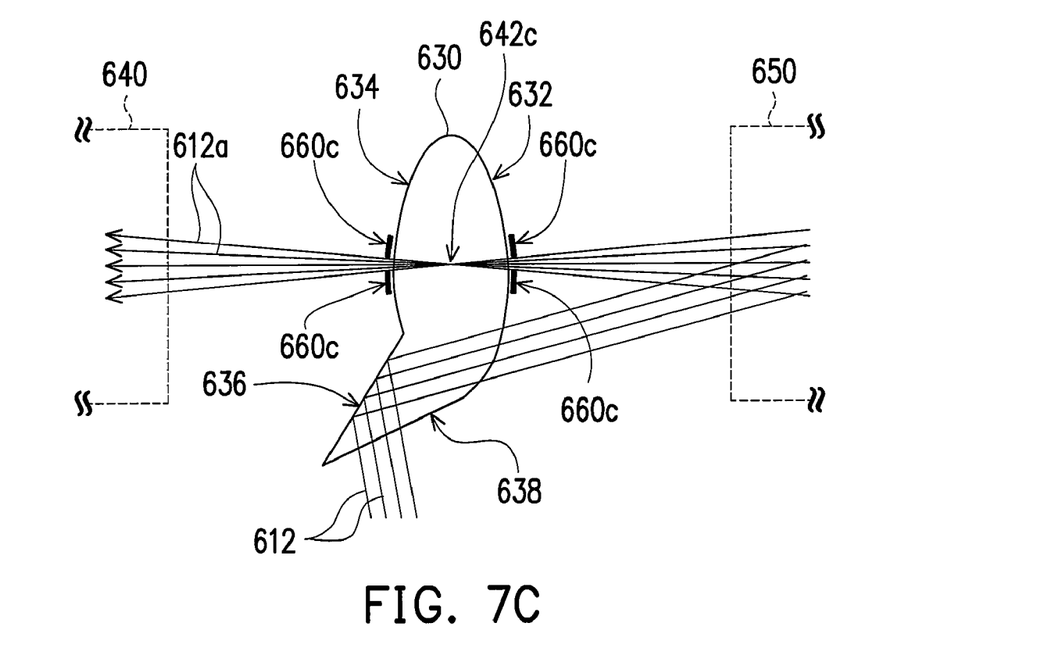

Furthermore, FIGS. 7B and 7C respectively show schematically enlarged diagrams of the aspheric prism according to another embodiment of the present invention. Referring to FIGS. 6 and 7B, a pupil 642b is located on the second curved surface 634 of the aspheric prism 630. The optical projection apparatus 600 further comprises an aperture stop 660b corresponding to the pupil 642b and the aperture stop 660b is arranged on the second curved surface 634. Referring to FIGS. 6 and 7C, a pupil 642c is located between the first curved surface 632 and the second curved surface 634. The optical projection apparatus 600 further comprises two aperture stops 660c corresponding to the pupil 642c and the aperture stops 660c are arranged on the first curved surface 632 and the second curved surface 634. In the aforementioned embodiment, the pupils 642a, 642b and 642c are arranged at positions corresponding to the aspheric prism 630, i.e., at the middle of the entire optical path. In accordance with the deposition of the aperture stops 660a, 660b and 660c, a large portion of the environmental stray light is blocked. Therefore, stray light enters the projection lens set 640 to form images therein is reduced, and the image quality is improved.

Figure 7D:
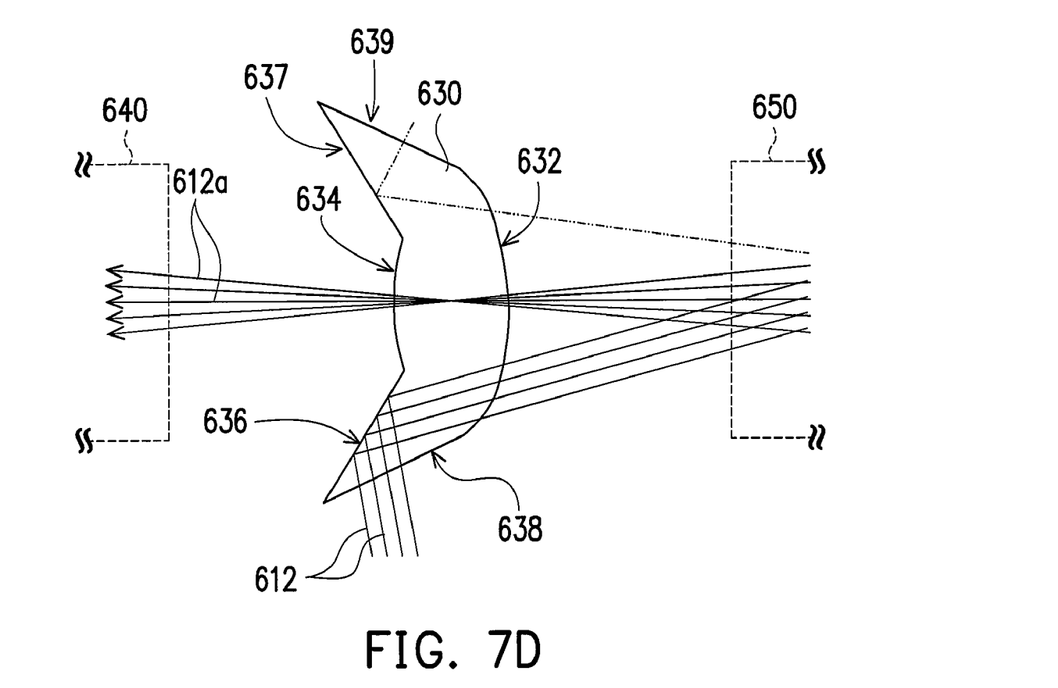
FIG. 7D is another schematically structure of the aspheric prism shown in FIG. 6.

FIG. 7D is another schematically structure of the aspheric prism shown in FIG. 6. Referring to FIGS. 6 and 7D, the aspheric prism 630 further comprises a reflective surface 637 and an emitting surface 639. The reflective surface is opposite to the total-reflection surface 636, and is connected to one rim of the second curved surface 634. The emitting surface 639 is connected between the first curved surface 632 and the reflective surface 637. When the light beam 612 is deflected by the OFF-state micro-mirrors, the light beam 612 is reflected by the reflective surface 637 and emits from the emitting surface 639, as depicted by the dash line.

According to the embodiments of the present invention, the aspheric prism 630 is used in the optical projection apparatus. The projection lens set 640, the aspheric prism 630 and the lens set 650 is integrated to form a projection lens (not shown). Thereafter, by only adjusting the relative position of the projection lens and the illuminating system 610, the accuracy for assembling the optical projection apparatus is increased. Moreover, the aspheric prism 630 is made by a molding or an injection method to reduce the manufacturing cost.

In summary, according to the optical projection apparatus of the present invention, the pupil is arranged at the position corresponding to the light deflecting device, the environmental stray light is effectively blocked together with the aperture stops, so that the image quality is increased. Moreover, since the light deflecting device utilizes an aspheric prism, the accuracy for assembling optical projection apparatus is increased. The aspheric prism is made by a molding or an injection method for further reducing cost.

While the present invention has been described with a preferred embodiment, this description is not intended to limit our invention. Various modifications of the embodiment will be apparent to those skilled in the art. It is therefore contemplated that the appended claims will cover any such modifications or embodiments as fall within the true scope of the invention.

What is claimed is:

1. An optical projection apparatus, comprising:
   an illuminating system for providing a light beam;
   a reflective light valve, arranged on an optical path of the light beam, wherein the reflective light valve is used for converting and reflecting the light beam into a plurality of sub-image beams;
   an aspheric prism, arranged on the optical path of the light beam and located between the illuminating system and the reflective light valve, wherein the aspheric prism comprises a first curved surface, a second curved surface, a total-reflection surface, and an incident surface, wherein the first curved surface is opposite to the second curved surface, the total-reflection surface is connected to one rim of the second curved surface and beside the second curved surface, the incident surface connects the first curved surface and the total-reflection surface and is located beside the first curved surface, wherein the light beam is capable of being incident into the aspheric prism through the incident surface, and capable of being totally reflected by the total-reflection surface, and then capable of being incident to the reflective light valve through the first curved surface, wherein the sub-image beams are sequentially capable of passing through the first curved surface and the second curved surface, and wherein the total-reflection surface is located outside an optical path of the sub-image beams between the first curved surface and the second curved surface;

a lens set, arranged on the optical path of the light beam and located between the reflective light valve and the aspheric prism, wherein the aspheric prism is used for receiving and transmitting the light beam to the lens set, the light beam is capable of being incident to the reflective light valve through the lens set, and the reflective light valve is capable of reflecting the sub-image beams to the first curved surface through the lens set; and a projection lens set, arranged on the optical path of the sub-image beams emitted from the second curved surface, wherein the projection lens set has a pupil at a position corresponding to the aspheric prism, and the lens set is used for converging the sub-image beams to the pupil and the sub-image beams are then capable of being incident to the projection lens set for imaging.

2. The optical projection apparatus of claim 1, wherein the pupil is located on the first curved surface of the aspheric prism, and the first curved surface faces to the lens set.

3. The optical projection apparatus of claim 2, further comprising an aperture stop, wherein the aperture stop is arranged corresponding to the pupil and located on the first curved surface of the aspheric prism.

4. The optical projection apparatus of claim 1, wherein the pupil is located on the second curved surface of the aspheric prism, and the second curved surface faces to the projection lens set.

5. The optical projection apparatus of claim 4, further comprising an aperture stop, wherein the aperture stop is arranged corresponding to the pupil and located on the second curved surface of the aspheric prism.

6. The optical projection apparatus of claim 1, wherein the pupil is located within the aspheric prism.

7. The optical projection apparatus of claim 6, further comprising two aperture stops, wherein the two aperture stops are arranged corresponding to the pupil and respectively located on the first curved surface and the second curved surface of the aspheric prism.

8. The optical projection apparatus of claim 1, wherein the reflective light valve is a digital micro-mirror device (DMD) or a liquid crystal on silicon (LCoS).

9. An optical projection apparatus, comprising:
an illuminating system, for providing a light beam;
a reflective light valve, arranged on an optical path of the light beam, wherein the reflective light valve is used for converting and reflecting the light beam into a plurality of sub-image beams;

an aspheric prism, arranged on the optical path of the light beam and located between the illuminating system and the reflective light valve, wherein the aspheric prism at least comprises a first curved surface, a second curved surface, a total reflection surface, and an incident surface, the first curved surface is opposite to the second curved surface, the total-reflection surface is connected to one rim of the second curved surface and beside the second curved surface, the incident surface connects the first curved surface and the total-reflection surface and is located beside the first curved surface, the light beam is capable of being incident into the aspheric prism through the incident surface and capable of being totally reflected by the total-reflection surface, and then capable of being incident to the reflective light valve through the first curved surface, wherein the sub-image beams are sequentially capable of passing through the first curved surface and the second curved surface, and wherein the total-reflection surface is located outside an optical path of the sub-image beams between the first curved surface and the second curved surface; and a projection lens set, arranged on the optical path of the sub-image beams emitted from the second curved surface.

10. The optical projection apparatus of claim 9, further comprising a lens set arranged on the optical path of the light beam and the sub-image beams, and located between the reflective light valve and the aspheric prism, wherein the lens set has a pupil located at a position corresponding to the aspheric prism, and the lens set is used for converging the sub-image beams to the pupil and then the sub-image beams are capable of being incident to the projection lens set for imaging.

11. The optical projection apparatus of claim 10, wherein the pupil is located on the first curved surface of the aspheric prism.

12. The optical projection apparatus of claim 11, further comprising an aperture stop, wherein the aperture stop is arranged corresponding to the pupil and located on the first curved surface.

13. The optical projection apparatus of claim 10, wherein the pupil is located on the second curved surface of the aspheric prism.

14. The optical projection apparatus of claim 13, further comprising an aperture stop, wherein the aperture stop is arranged corresponding to the pupil and located on the second curved surface.

15. The optical projection apparatus of claim 10, wherein the pupil is located between the first curved surface and the second curved surface.

16. The optical projection apparatus of claim 15, further comprising two aperture stops, wherein the two aperture stops are arranged corresponding to the pupil and respectively located on the first curved surface and the second curved surface.

17. The optical projection apparatus of claim 9, wherein the reflective light valve is a digital micro-mirror device (DMD) or a liquid crystal on silicon (LCoS).

* * * * *